E. G. DODGE.
PRIMARY BATTERY.
APPLICATION FILED AUG. 23, 1910.
1,090,909.
Patented Mar. 24, 1914.
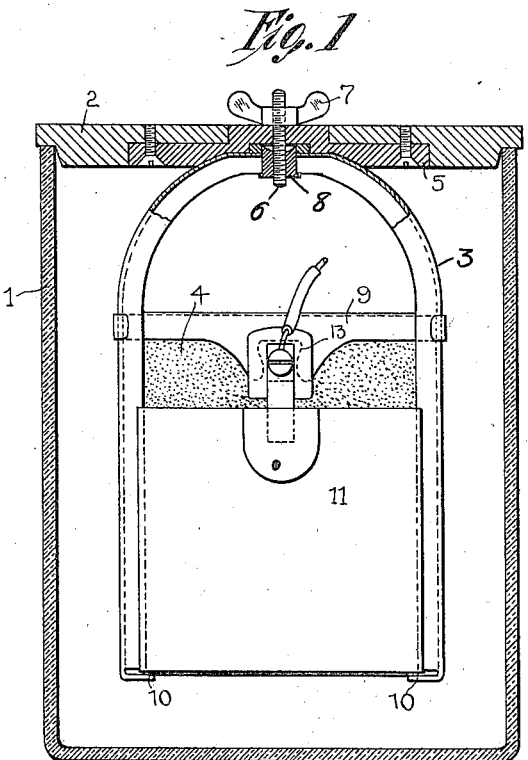
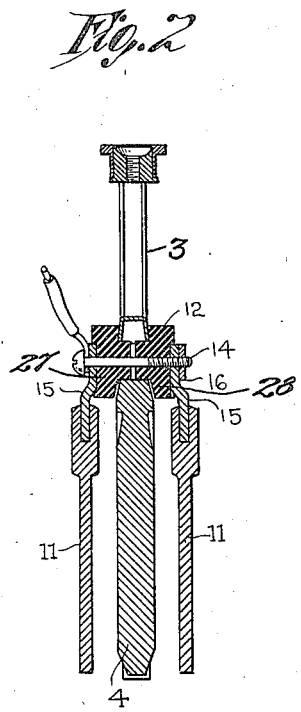
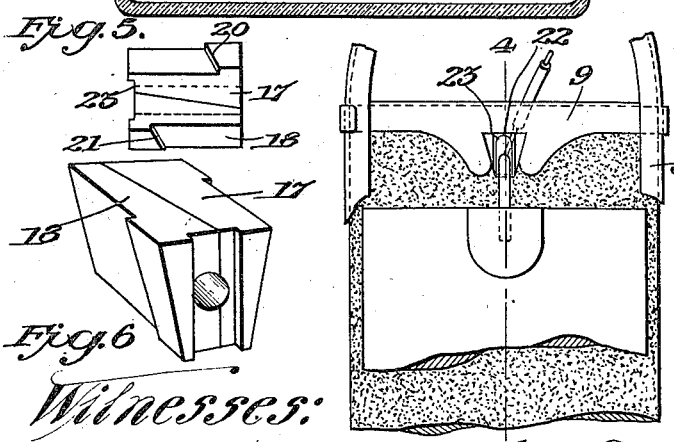
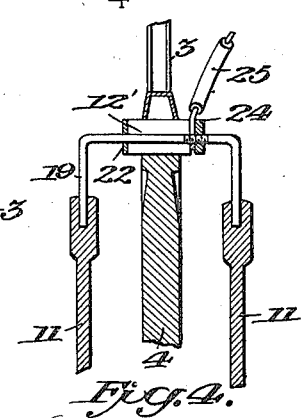
Witnesses:
Robert M. Sutphen
Dyer Smith
Inventor:
Eben G. Dodge
by Frank L. Dyer
His Atty.

UNITED STATES PATENT OFFICE.

EBEN G. DODGE, OF MAPLEWOOD, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

PRIMARY BATTERY.

1,090,909. Specification of Letters Patent. Patented Mar. 24, 1914.

Original application filed June 12, 1909, Serial No. 501,821. Divided and this application filed August 23, 1910. Serial No. 578,515.

*To all whom it may concern:*

Be it known that I, EBEN G. DODGE, a citizen of the United States, and a resident of Maplewood, Essex county, New Jersey, have made a certain new and useful Invention in Primary Batteries, of which the following is a description.

My invention relates to improvements in primary or voltaic batteries of that class in which the negative electrode consists of a plate of oxid of copper or other depolarizing agent properly molded and agglomerated, and the positive electrode consists of a plate or plates of zinc.

This application is a division of my application Serial No. 501,821, filed June 12, 1909, entitled improvements in primary battery, and is an improvement on the invention described in my Patent No. 894,487 for primary batteries, granted July 28, 1908, and the object of my invention is to simplify, cheapen, and render more efficient the construction of batteries of the above described class.

My invention consists further in the details of construction and combinations of parts hereinafter more particularly described and claimed.

In the accompanying drawings forming part of this specification, Figure 1 illustrates a vertical section through a battery embodying my invention, shown partly in section and partly in side elevation. Fig. 2 is a transverse vertical section through the same. Fig. 3 is a fragmentary side elevation showing one manner of mounting the positive elements in relation to the negative element of the battery, and Fig. 4 is a section on line 4—4 of Fig. 3. Fig. 5 is a bottom view of the divided insulator for separating the plates shown in Figs. 3 and 4, and Fig. 6 is a perspective view of the same.

Referring to the drawings, 1 indicates an ordinary containing jar preferably of porcelain and provided with the usual cover 2 also preferably of porcelain. The numeral 3 indicates a frame or hanger preferably constructed of a strip of sheet copper or copper plated iron, the edges of said strip being turned up to such an extent as to lie flat against the bevel edges of the negative electrode plate 4. The whole hanger 3 is preferably given the form of an inverted U, the two arms of which hold the edges of the negative plate 4. The upper portion of the frame or hanger 3 is supported by the cover 2 of the battery in any convenient manner, as by means of the plate 5 which is countersunk in the cover 2, the hanger 3 being supported from said plate 5 by means of the screw 6 and butterfly nut 7, the hanger 3 being provided with a suitable bearing 8 on the upper portion of the yoke thereof for the screw 6. The cross piece 9 is provided as indicated, being mounted upon the top of the negative plate 4 and secured to the two arms of the hanger 3. The bottoms of the arms of the hanger 3 are bent inwardly as shown at 10 to form a bottom support for the plate 4.

In the form of the device illustrated in Figs. 1 and 2, the positive plates 11, which are preferably of zinc as stated, are supported, as indicated, with the upper ends thereof some distance below the top of the negative plate 4. The provision of this form of mounting of the plates is one of the features of my invention, as I find that thereby the electrolytic action of the cell results in a more uniform utilizaton of the negative plate, 4, than when the tops of the positive plates 11 are level with the top of the negative plate 4 in the ordinary manner. The action of the cell at the upper portion of the plates is always more energetic than toward the bottom of the plates. Hence, with the positive plates having their upper edges level with the upper edges of the negative plate, the latter is reduced much more rapidly in this portion, so that finally, the unreduced portion of the negative plate has the form of an elongated inverted V. With the manner of mounting here illustrated, however, and the beveling of the negative plate above the top of the positive plates in the manner indicated, a much more uniform reduction of the negative plate ensues during the action of the cell, whereby waste of the material comprising the negative plate is avoided and the life of the cell is increased.

As illustrated in Figs. 1 and 2, the insulator 12 of any suitable material is inserted through the opening 13 in the cross piece 9, the sides of this opening being tapered as shown, and the bolt 14 passed through the center of the insulator 12, the positive plates 11 being joined one to either end of this bolt 14 by means of connections 15 soldered or otherwise suitably secured to the plates 11 and mounted on the bolt 14, the parts being firmly drawn together by means of the nut 16.

The insulator 12 may consist of two parts 27 and 28, and has tapered portions engaging the tapered sides of the opening 13 in the cross piece 9.

In the form of my invention illustrated in Figs. 3, 4 and 5, the insulator 12' is composed of two tapered members 17 and 18. The connections 15 and bolt 14 shown in Fig. 2 are, in this form of my invention, made in one integral bent piece 19, which is adapted to pass through a recess formed one-half in each of the co-acting vertical faces of the split insulator 12'. The tapered members 17 and 18 of this insulator are adapted to be forced into position, one on each side of the member 19 within the opening 13 of the cross piece 9, one of the members of the insulator being forced in from one side of the plate 4 and the other from the other side, until the shoulders 20 and 21 of the insulators 17 and 18 contact the outer surfaces of the opposite sides of cross piece 9 respectively. The connecting member 19 is formed with a lug 22 turned up thereon, this lug being adapted to contact the inner surface of the recess 23 formed on the adjacent ends of insulator members 17 and 18. The connecting member 19 is screw threaded beyond the opposite ends of insulator members 17 and 18, and is provided with a nut 24 which is threaded on the screw threaded portion of member 19 and may be drawn up to hold the parts tightly together, the leading out wire 25 being secured between the insulator and the said nut 24.

In assembling the parts, the zincs 11 connected by the member 19 are placed in position with the member 19 extended through the opening 13 before the negative plate 4 is introduced into the frame. The negative plate 4 is then introduced and secured in the frame, and the tapered members 17 and 18 of the insulator slipped into position.

Having now described my invention, what I claim and desire to protect by Letters Patent is as follows:—

1. In a voltaic battery, the combination of a negative electrode plate and a pair of positive electrode plates, said positive plates being supported one on each side of said negative plate and substantially parallel thereto, each of said positive plates being substantially co-extensive with said negative plate except at the tops of said plates, and the tops of said positive plates being located a considerable distance lower than the top of said negative plate, said distance being sufficient to permit a substantially uniform utilization of said negative plate, substantially as described.

2. In a voltaic battery, the combination of a negative electrode plate, a pair of positive electrode plates, all of said plates having substantially the same width and the said negative plate having considerably greater height than said positive plates, and means for supporting said positive plates one on each side of said negative plate with the bottoms of all of said plates at substantially the same level and with the tops of said positive plates a considerable distance below the top of said negative plate, said negative plate being beveled upwardly above the tops of said positive plates, substantially as described.

3. In a voltaic battery, the combination of a copper oxid plate, a pair of zinc plates, all of said plates having substantially the same width, the copper oxid plate having considerably greater height than said zinc plates, and means for supporting said zinc plates one on each side of said copper oxid plate with the bottoms of all of said plates at substantially the same level and with the tops of said zinc plates a considerable distance below the top of said copper oxid plate, the copper oxid plate being beveled upwardly above the tops of said zinc plates, substantially as described.

4. In a voltaic battery, the combination of an electrode plate of one polarity, a pair of electrode plates of opposite polarity thereto, a supporting cross piece, a split tapered insulator supported by said cross piece, and means supported by said insulator for supporting said pair of plates one on each side of said first named plate and electrically joining the same, substantially as described.

5. In a voltaic battery, the combination of an electrode plate of one polarity, a pair of electrode plates of opposite polarity thereto, a supporting cross piece, a split tapered insulator supported within a tapered recess in said cross piece, and means passing through and supported by said insulator for supporting said pair of plates one on each side of said first named plate and electrically joining the same, said means having a lug adapted to contact with one end of said split insulator and being screw threaded and provided with a nut beyond the other end of said insulator, for drawing said parts firmly together, substantially as described.

6. In a voltaic battery, the combination of an electrode plate of one polarity, a pair of electrode plates of opposite polarity thereto, a supporting cross piece, a split insulator composed of two wedge-shaped pieces supported by said cross piece and each having a shoulder adapted to contact with the respective opposite sides of said cross piece, and means supported by said insulator and passing through a recess formed in the coöperating members of the same, for supporting and joining electrically said pair of plates, substantially as described.

7. In a voltaic battery, the combination with positive and negative elements, of a supporting frame therefor including a cross piece having an opening the sides of which are tapered, an insulating member having a tapered portion adapted to be secured in the opening of the cross piece and supported thereby, and means for securing some of said elements to the said insulator, substantially as described.

8. In a voltaic battery, the combination with an electrode plate of one polarity and a pair of electrode plates of opposite polarity thereto, of a supporting cross piece having an opening with tapered sides, an insulator having a tapered portion supported by said cross piece and coacting with the tapered sides thereof, and means for supporting said pair of plates from said insulator, substantially as described.

9. In a voltaic battery, the combination with positive and negative elements, of a supporting frame having a channel-shaped cross piece provided with tapered openings in the channel walls, an insulator having tapered portions adapted to be received in said openings and supported from the cross piece, and means for securing some of said elements to said insulator, substantially as described.

10. In a voltaic battery, a supporting frame for battery elements including a channel-shaped cross piece provided with tapered openings in the channel walls, substantially is described.

11. In a voltaic battery, a supporting frame for battery elements including a channel-shaped cross piece provided with tapered openings in the channel walls, and an insulator supported by the said cross piece and in the said openings, substantially as described.

12 In a voltaic battery, a supporting frame for battery elements including a cross piece having depending lips provided with downwardly tapered openings, substantially as described.

13. In a voltaic battery, a supporting frame for battery elements including a cross piece having depending lips provided with downwardly tapered openings, and an insulator supported by the said cross piece and in the said openings, substantially as described.

This specification signed and witnessed this 19th day of August 1910.

EBEN G. DODGE.

Witnesses:
ANNA R. KEEHM,
JOHN BURKE.